US007197458B2

(12) United States Patent
Lydecker et al.

(10) Patent No.: US 7,197,458 B2
(45) Date of Patent: Mar. 27, 2007

(54) METHOD AND SYSTEM FOR VERIFYING DERIVATIVE DIGITAL FILES AUTOMATICALLY

(75) Inventors: George H. Lydecker, Burbank, CA (US); Todd Yvega, North Hollywood, CA (US)

(73) Assignee: Warner Music Group, Inc., New York, NY (US)

( * ) Notice: Subject to any disclaimer, the term of this patent is extended or adjusted under 35 U.S.C. 154(b) by 1028 days.

(21) Appl. No.: 10/142,510

(22) Filed: May 9, 2002

(65) Prior Publication Data

US 2002/0198703 A1 Dec. 26, 2002

Related U.S. Application Data

(60) Provisional application No. 60/290,104, filed on May 10, 2001.

(51) Int. Cl.
*H04L 1/00* (2006.01)
*G10L 21/00* (2006.01)
*G06F 11/00* (2006.01)

(52) U.S. Cl. .................... 704/270; 704/278; 348/425.1

(58) Field of Classification Search ................ 704/205, 704/206, 220, 221, 270, 278; 370/503, 508, 370/517; 348/425.1, 425.4; 714/25
See application file for complete search history.

(56) References Cited

U.S. PATENT DOCUMENTS 5,040,081 A * 8/1991 McCutchen .................. 386/66
5,546,395 A * 8/1996 Sharma et al. .............. 370/468
5,592,618 A 1/1997 Micka et al.
5,631,984 A * 5/1997 Graf et al. .................. 382/317
5,740,146 A * 4/1998 Webster ...................... 369/107
5,914,971 A 6/1999 Carter et al.
6,014,618 A * 1/2000 Patel et al. ................. 704/207
6,169,763 B1 * 1/2001 Woodward et al. ......... 375/224
6,263,308 B1 * 7/2001 Heckerman et al. ........ 704/231
6,477,492 B1 * 11/2002 Connor ....................... 704/236
6,622,121 B1 * 9/2003 Crepy et al. ................ 704/243
6,963,975 B1 * 11/2005 Weare ........................ 713/176

OTHER PUBLICATIONS

Proceedings of the IEEE; Jul. 1999; vol. 87 No. 7; The Use of Watermarks in the Protection of Digital Multimedia Products; p. 1197-1207pp; by George Voyatzis, Ioannis Pitas.
International Search Report dated Sep. 13, 2002; foreign counterpart patent application PCT/US02/14650 filed May 9, 2002; entitled: Automatic Analysis of Audio Files; Inventor: George H Lydecker.

* cited by examiner

*Primary Examiner*—Martin Lerner
(74) *Attorney, Agent, or Firm*—Gottlieb, Rackman & Reisman, P.C.

(57) ABSTRACT

A method and apparatus for verifying automatically that a plurality of derivative audio (or other multimedia) files have acceptable sound quality. In one embodiment, each derivative file is compared on a byte-by-byte basis to a corresponding original file to generate a difference. The difference is compared a threshold value (that may be determined empirically). If the difference is too large for many bytes, the derivative file is tagged as having an unacceptable sound quality. In another embodiment, segments of the original and derivative files are converted to the frequency domain and analysis is performed in this domain. The resulting signal could be a tag indicating that whether the derivative file is acceptable, or could be a more comprehensive signal indicative what kind of errors were detected and in what temporal and/or spectral region for diagnostic purposes.

4 Claims, 6 Drawing Sheets

METHOD AND SYSTEM FOR VERIFYING DERIVATIVE DIGITAL FILES AUTOMATICALLY

RELATED APPLICATIONS

This application claims priority to application Ser. No. 60/290,104 filed May 10, 2001 and incorporated herein by reference.

BACKGROUND OF THE INVENTION

1. Field of the Invention

The present invention pertains to a system and method for verifying that files obtained through digital data processing have acceptable characteristics.

The system and method are particularly useful for analyzing and assessing automatically the sonic quality of a large number of digital audio files and other similar files containing audiovisual programs.

2. Background of the Invention

Presently comparing a derivative digital version of a file to an original file is accomplished in one of two ways. If the files have the same format they could be compared directly, bit-by-bit. This type of comparison is useful in checking the quality of a simple data transmission device or checking a file that is a copy of another file. A bit-to-bit comparison is useful in such cases because the file being checked is expected to be identical to the original.

This type of comparison, however, is not practical for verifying files that have undergone extensive signal processing or other type of transformation since they are not substantially identical to the original files. For example, a digital audio file that has been compressed, watermarked, or derived in some other manner from an original audio file may still have a sonically acceptable quality even though the derivative file is substantially different from the original if a bit-to-bit comparison is used. Therefore, other techniques must be used for checking these types of files. One such technique is essentially a manual technique in the sense that it requires each derivative file to be checked individually. The manual technique requires derivative audio files to be verified by a specially trained audio engineer by listening to each digital file separately and using his subjective opinion to determine whether that file has acceptable audio quality. This technique is used to check various different types of digital files for recording entertainment and other similar content (e.g., audio, video, image, and multimedia). However, for the sake of clarity, in the present application the term 'digital audio file' is used to cover generically all other types of digital files as well, such as digital video files.

The manual technique has several problems. The first problem is that it must be performed in real time. That is, if a file contains an audio selection sixty minutes long, the audio technician must spend sixty minutes to listen to it. Accordingly, this technique is very slow and labor intensive. The second problem is that it is expensive since it requires trained and experienced audio engineers. The third problem is that, like with any other extended task performed manually and relying on subjective criteria, its accuracy and repeatability is inconsistent. For example, after listening to files for extended periods of time, the audio engineer may become fatigued and inattentive, and accordingly, he may reject some of the files, especially files that are on the borderline, which he may find acceptable at other times, and vice versa.

These problems clearly point to a need to automate the process of verifying derivative digital audio files. Such an automated process would be of value for many endeavors, but especially important for the entertainment industry.

OBJECTIVES AND SUMMARY OF THE INVENTION

In view of the above-mentioned disadvantages of the prior art, it is an objective of the present invention to provide a method and apparatus that is capable of verifying the sonic quality of a large number of derivative digital audio files quickly and effectively.

A further objective is to provide a method and apparatus that can be used to verify derived digital audio files by comparing some characteristics of the derived files with characteristics of the original files.

A further objective is to provide a method and apparatus that can check a large number of files rapidly automatically if these files were derived using a common digital signal processing system, utilizing, CODECs and other similar devices.

Yet another objective is to provide a method and system that can be adapted easily to handle files derived from a variety of different sources and/or a variety of different processes.

A further objective of the invention is to provide an apparatus that is capable of generating reports that indicate the results of comparing the derivative files to the original files, the reports including specific information, such as the locations and/or frequencies at which the derivative and original files are substantially different.

Yet another objective is to provide a method and apparatus for checking the sonic quality of digital audio files by generating selectively a tag for each file indicative of whether the audio file is acceptable or not, and a report with more detailed information.

Yet another objective is to provide a method and apparatus that can be adapted to verify digital files for different forms of the same content.

Other objectives and advantages of the invention will become apparent from the following description.

The main problem addressed by the present invention pertains to the question of how to automate the process of comparing an original music file (for example, in PCM format) with a transformed or derivative music file (e.g., one which was decoded from some sort of lossy compression scheme). By the very definition of a lossy compression scheme, the data after encoding and decoding does not match the original data exactly, but merely resembles it in some way considered acceptable to human perception. In the case of audio, it has been found that human perception is primarily based on the shape of the frequency magnitude spectrum, not on the shape of the waveform. Consequently, lossy audio compression circuits (henceforth referred to as "CODECs") work by discarding much of the information contained in the original PCM data which is not considered crucial to perception (phase spectrum, non-critical frequencies, etc.) The result of this manipulation is that even though a listener will perceive the transformed file as sounding reasonably "the same", the waveform data will often look very different to a computer.

Consequently, merely programming a computer to detect deviations in the PCM data between the two files is inadequate, because it will find sizeable deviations which do not actually represent errors perceived by the listener. A scheme must be used to enables a computer to perceive the music in the same manner that a listener does.

As previously indicated, the deviations in the PCM data (representing the analog audio waveform) between an original audio file and a file decoded from an encoded version of the original, are due to non-critical details that the CODEC discarded. So in order to achieve a meaningful comparison, the same details must also discarded, and only the crucial information should be considered.

A typical audio CODEC work generally as follows:

(1) the time domain (waveform) data is transformed into a corresponding signal in the frequency domain:

This results in a two fold reduction. For example, 8192 sequential time samples can be transformed into 8192 discrete frequency components, each component corresponding to the magnitude of the signal in a frequency band, the frequency bands extending from 0 cycles per second (DC) and the sampling rate. The "real" part of this spectrum represents the magnitude for each frequency whereas the "imaginary" part represents the phase for each frequency. Since phases are not considered critical to human perception, the imaginary part is discarded. The upper half of the frequency range (Nyquist to sampling rate) is a redundant mirror image of the lower half (0 to Nyquist), so the upper half of the frequency range is discarded, resulting in 4098 frequency samples. The Nyquist rate is half the sampling rate. For example, if a digital file is obtained using a sampling rate of 44.1 KHz then the Nyquist rate is 22.05 KHz.

(2) Frequencies that are not considered critical can also be discarded resulting in further reduction The DC component carries no information and therefore can be discarded. Components at very high frequencies (usually above 16 KHz to Nyquist), and certain bands of frequencies that are deemed to be non-critical to the content at a given moment in time can also be discarded.

(3) Finally, the remaining data can be Huffman-encoded, or some other encoding scheme may be used for further reduction of data.

With this basic understanding of what the CODECs do, the effect of a CODEC may be emulated and thereby compare only the content that was intentionally reproduced.

Some additional considerations that are used in selecting a testing scheme include:

(1) Stereo Imaging:

Stereo imaging is heavily dependent on phase information. Since phase information is typically discarded by CODECs, the stereo imaging is accordingly compromised. (Presumably, stereo imaging is one of those aspects of music that has been deemed by the designers of CODECs as being "non-critical".) Furthermore, some CODECs (such as MPEG 2, layer 3) have a "joint stereo" feature which can further affect the relative magnitudes of frequencies between channels. What this means is that while the magnitude of a certain frequency may be accurately reproduced in composite signal of the transformed file, that total magnitude may not be distributed among the individual channels in the same proportions as in the original. Consequently, comparing on a channel-by-channel basis would defeat the objective of comparing only those aspects of the audio that the CODEC is designed to retain. To avoid this, the left and right (and other channels, if used) channels are combined by summing and then dividing the result by the number of channels. Channel merging affords the added benefit of almost halving the processing time since the FFT is by far the most processor-intensive part of the process.

(2) FFT and Spectral Window:

As discussed above, the present invention contemplates converting files from the time to the frequency domain using well-known Fast Fourier Transform (FFT) algorithms. When performing an FFT scheme to convert a series of time domain samples to a series of frequency domain samples (or vise versa), the length of the input series equals the length of the output series. For example, sixteen evenly spaced time samples yield sixteen evenly spaced frequency samples dividing the range from 0 to the sampling rate. Accordingly, we can achieve a specific frequency resolution at the output by selecting the proper number of time samples at the input. This interval of time is known as the spectral window. Because the lowest frequency reproduced by most CODECs is about 20 Hz, a scheme must be used that has sufficient resolution to distinguish 20 Hz from the next adjacent frequency. This is accomplished by choosing a window width that divides 44100 Hz (the typical sampling rate) down to roughly 20 Hz increments. Hence a window with a width ~=44100/20~=2048 is used (FFT algorithms require windows having widths that can be expressed as a power of 2. A window width of 2048 time samples results in 2048 discrete frequency components between 0 and 44100 Hz, in increments of approximately 21.5 Hz. These components are assigned sequential 'bin' numbers by the FFT algorithms. Each frequency component can, therefore, be calculated from the bin number using the expression F(bin) =Bin*44100 Hz/2048

Thus:

F(0)=0*44100/2048=0.0 Hz (DC component)

F(1)=1*44100/2048~=21.5 Hz

F(2)=2*44100/2048~=43.0 Hz

F(1023)=1023*44100/2048~=22028.5 Hz (one below Nyquist).

It should be remembered that FFT algorithms generate complex numbers. Since the time samples are real (i.e., their imaginary parts are always zero) the resulting frequency range from Nyquist to the sampling rate is simply the complex conjugate of the mirror image of the range from 0 to Nyquist. Obviously for real time samples, the FFT algorithms have a lot of redundancy which consume excessive processing time. To reduce this redundancy, adjacent pairs of the 2048 real time samples are packed into 1024 complex time samples which results in a scrambled spectrum that can be quickly de-scrambled to represent the 1024 real frequencies from 0 to the Nyquist frequency.

In taking 2048 time domain samples at a time, inevitably some discontinuities are introduced at the edges of the window. This would result in corrupting sidebands when transformed to the frequency domain. To avoid this problem, the time domain samples are first tapered at the ends by a curve (typically referred to as a spectral window.) There are many well known curves that can be used for this purpose. The inventors utilized a Hanning (Cosine Bell) curve for this purpose for two reasons. It has a close to optimal trade-off between sideband suppression and approximation of a flat frequency response. Moreover, a series of Hanning windows offset by half the width sum to unity. This is important because, in order to insure that the comparison is as accurate as possible, sequential windows overlap by about 50%. This scheme is advantageous because, if, for instance, a glitch in the derivative audio file that happens to be very near to the edge of a window where it is tapered nearly to zero, it will have substantially no impact on the frequency response and therefore go unnoticed by the comparison. However, in the subsequent iteration, the window is moved such that the glitch occurs near its center and a maximum impact. The net effect over the course of subsequent transformations and comparisons is that every sample received equal weight.

In one embodiment, the present invention utilizes the steps of: synchronizing the derivative digital file samples and the original digital file samples; comparing portions of the synchronized derivative and original digital files; and tagging any deviation between the derivative and original digital files.

In another embodiment, the present invention utilizes the steps of: synchronizing the derivative digital file samples and the original digital files; comparing the synchronized derivative and original digital files by calculating the differences between the derivative and original digital files; generating a difference spectra by taking the Fourier transform of the calculated differences and tagging deviations as indicated by said differences.

In yet another embodiment, the present invention utilizes the steps of: combining multiple channel data into a single data stream; conforming derivative digital multiple channel data into a single data stream; performing a Fourier transform on the combined original single data stream to create original frequency files; performing a Fourier transform on the combined derivative data stream to create derivative frequency files; subtracting the original frequency from the derivative spectra samples producing a difference result; taking a standard deviation of the difference result; comparing the standard deviation of the difference result with what expected norm values would be; subtracting the first bin from the second bin thereby creating a third bin; comparing the third bin with what expected norm values would be; flagging the standard deviation of the difference result if it exceeds a predetermined threshold; and generating a tag indicative of whether derivative files are acceptable.

In yet still another embodiment, the present invention is a system for comparing derivative digital files samples with original digital file samples, in which the system has the following elements: a synchronizer receiving the derivative digital files and the original digital files, the synchronizer being configured to synchronize the derivative digital file samples with the original digital file samples; a comparator configured to calculate the differences between the synchronized derivative and original digital files; and a tag generator configured to generate tags based on deviations between the derivative and original digital files.

The aspects and advantages of the present invention can be better understood in light of the following detailed description and drawings.

DETAILED DESCRIPTION OF THE INVENTION

Figure 1:
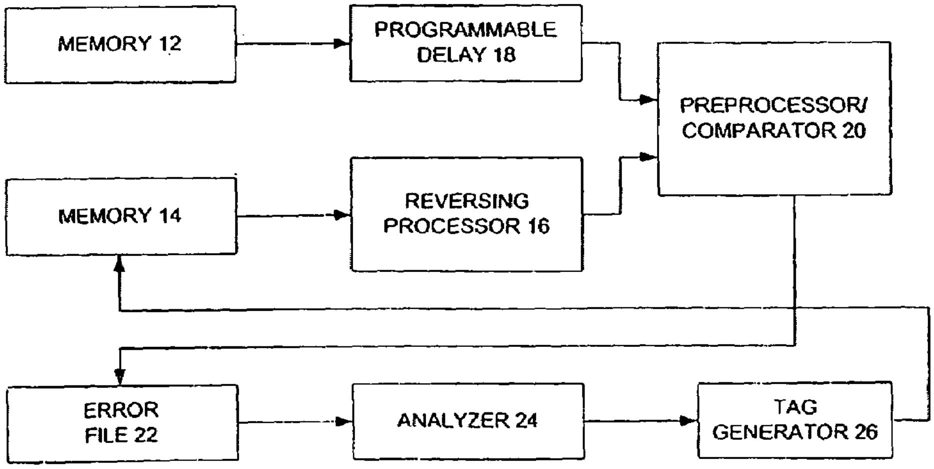
FIG. 1 shows a generic block diagram of the system constructed in accordance with this invention.

FIG. 1 shows a somewhat generic block diagram of a system 10 constructed in accordance with this invention. It includes two memories; a memory 12 used to store a plurality of original digital files and a memory 14 holding the corresponding modified or derivative digital files. (Of course, a single memory may be used as well.) The derivative digital files are generally obtained by performing digital processing on the original digital files. In FIG. 1, each original files is recalled from memory 12 and a corresponding derived file is recalled from memory 14. The derivative digital files may have to be processed by a reversing processor 16 in order to generate file reversed files having a format compatible for comparison with the original files. Of course, the nature of the reversing processor 16 depends on the processes used to obtain the derivative files. For example, if the original files were compressed, then the reversing processor has to decompress the derived files. The resulting reversed files should have characteristics similar to that of the original files. Some processing, for example, watermarking, may not need any reverse processing.

Frequently, during processing, certain delays are introduced into derivative files as discussed below specifically in conjunction with CODECs. In order to compensate for these delays, a programmable delay 18 is provided which is set to compensate for these delays. (In FIG. 1 the programmable delay is shown as a separate element, but it should be understood that it may be implemented by delaying recalling the original file.)

The reversed and delayed files are fed to a preprocessor/comparator element 20 that performs any preprocessing on these files (if necessary) and then performs a comparison therebetween. The result is an error file 22 representative of the differences between segments or frames of each original and corresponding derivative file. This error file is then fed to an analyzer 24. The analyzer checks the error file using certain predetermined criteria and the results are fed to a tag/report generator 26 that generates a tag and/or a complete report for each derived file in memory 14. The tag may contain a simple indication, such as pass, fail, system error, while the report may contain details of the analyses, including listings of locations within the files where errors of certain type or magnitude have been detected. The report can be used for diagnostic purposes.

Figure 2:
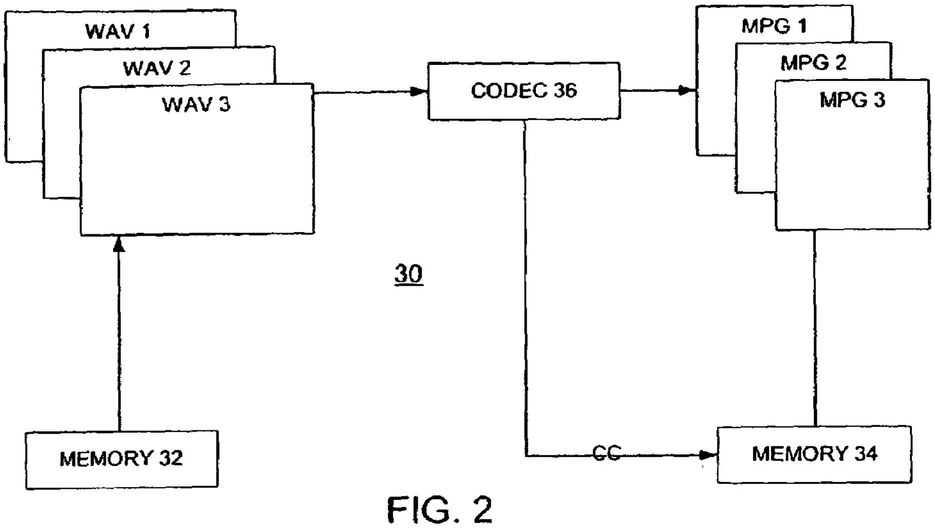
FIG. 2 PRIOR ART
FIG. 2 shows a block diagram of a prior art system used to generate derivative files from digital audio files.

In order to provide a better understanding of the invention, reference is now made to the drawing in FIG. 2 which illustrates a system 30 used for the conventional generation of derivative files, for example in MPEG format. Once again, the original files WAV 1, WAV 2, WAV 3 in WAV format are stored in a memory 32. Each of these files is fed to a CODEC 36 which compresses them to generate corresponding derivative files MPG 1, MPG 2 MPG 3. These derivative files are stored in a memory 34. In addition, various characteristics CC of the CODEC 36 are also stored in the memory 34. Typical characteristics of various CODECs are shown in FIG. 10 and discussed in more detail below.

Figure 3:
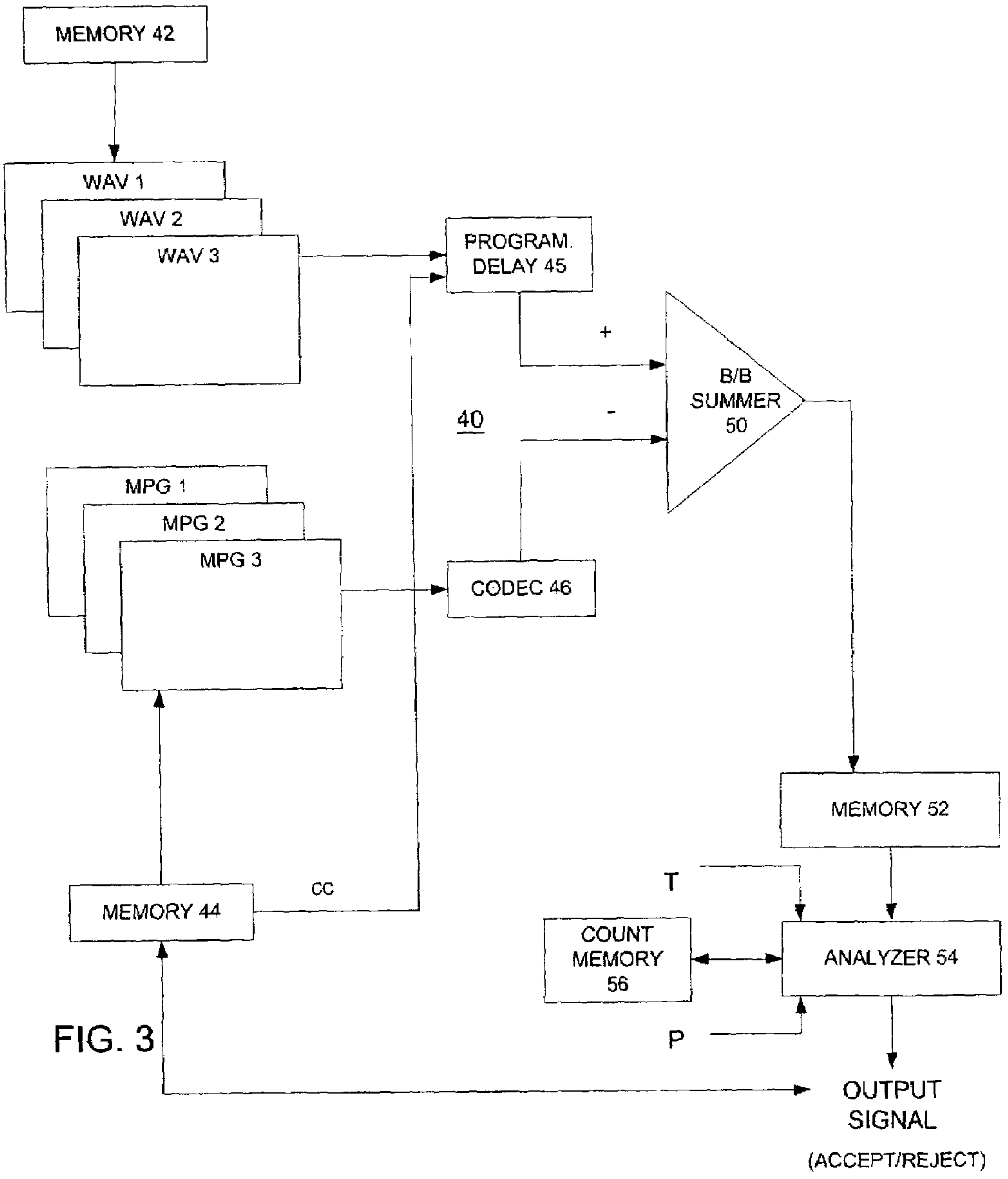
FIG. 3 shows a block diagram of a first embodiment of the system.

FIG. 3 shows a system 40 that represents a first embodiment of the invention, in which a relatively simple algorithm is used for verifying the derivative files. The system includes two memories 42, 44 that are used to hold the original digital files WAV 1, WAV 2, WAV 3 and derivative digital files MPG 1, MPG 2, MPG 3, respectively. In addition, the characteristics CC of the CODEC used to generate the derivative files is also stored in memory 44. All this data can also be stored in a single memory, however, two memories are shown for the sake of clarity.

This embodiment works most effectively when each original data file and the corresponding derivative file have the same bit depth and sample rate.

Therefore, the files from memory 44 are fed to a CODEC 46 where they are expanded. Thus, CODEC 46 manipulates the derivative files in a manner complementary to the CODEC 36, thereby generating intermediate files that have substantially the same bit depth and sample rate as the original files. In addition, the files from memory 42 are fed to a programmable delay 45. The extent of the delay is determined from the characteristics CC of the CODEC 36 and is selected so that delayed file from the delay 45 is properly lined up or synchronized with the corresponding intermediate file from the CODEC 46. Obviously other means for insuring alignment may be used as well.

Each pair of delayed and intermediate file is then fed to summer 50. The summer 50 compares the files on a byte-to-byte basis. More specifically, the comparator generates an error byte, which corresponds to the difference between a byte from the original file and intermediate file. The error bytes are stored in a memory 52 to generate an error file. An analyzer 54 is used to analyze the error file in accordance with a predetermined set of rules. For example, the analyzer may compare each error byte to a reference value. If any error byte is larger than the threshold value, an error count is implemented. A derivative file is rejected if the corresponding error count exceeds a preselected limit. Alternatively, other criteria for analyzing the differences may be used. For example, the analyzer could use an N of M type test, or other statistical criteria.

The analyzer generates an output signal that could be a simple tag, i.e., a reject/accept signal, or it could be a more detailed report, including information that identifies the bytes that caused the rejection of the derivative file. The output signal is stored in memory 44 either as a tag that is attached or associated with respective derivative file, or as a separate file that can be used to troubleshoot the original conversion process (shown in FIG. 2), the analyzing process, or system 40. The analysis can be stopped as soon as the rejection criteria has been met or can go on to completion independently of the rejection criteria.

Figure 4:
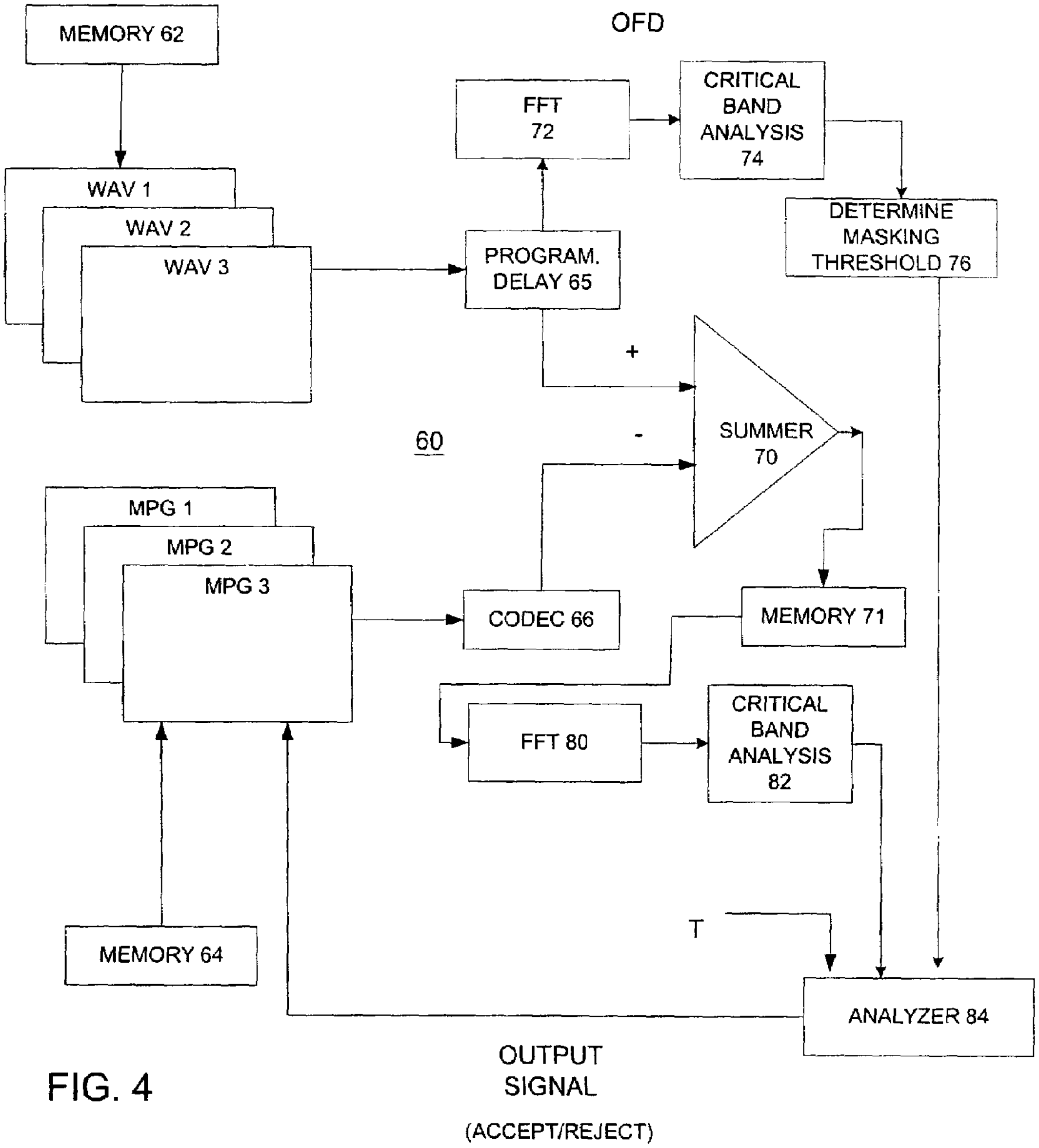
FIG. 4 shows a block diagram of a second embodiment of the system.

FIG. 4 shows a system 60 in which a different algorithm used for analyzing files. In this system, a summer 70 receives delayed files from a programmable delay 65 and intermediate files from CODEC 66 based on original and derivative files stored in memory 62 and 64, in a manner similar to the one described and shown in FIG. 3. Summer 70 then generates error bytes stored in a memory 71 as an error file. However, in this embodiment, the delayed files are also fed to a circuit 72 that takes a Fourier Transform of each file and generates a corresponding original file in the frequency domain (file OFD). This file OFD is then analyzed by a critical band analyzer 74 that determines the frequency content of OFD at certain predetermined frequency bands. Preferably, these frequency bands are the bands known in psychoacoustics to describe the finite width of the vibration envelope characteristic of the hearing process of individuals and have been used to test the quality of CODECs.

Next, a circuit 76 detects a value or amplitude Tf for OFD at each of the bands. Frequencies that are not considered critical can also be discarded resulting in further reduction of data. This includes the DC component (frequency=0), and very high frequencies (usually about 16 KHz to the Nyquist frequency).

The error file from memory 71 is sent to a Fast Fourier Transform circuit 80 that generates a corresponding file EFD in the frequency domain. File EFD is then passed through a critical band analyzer 82 that extracts the components of this file at the critical frequency bands discussed above. These components are fed to analyzer 84.

The threshold levels Tf from circuit 76 for a particular file OFD which specific frequency bands have a significant signal content. The analyzer 84 compares for each frequency band the components of the difference file EFD with the respective threshold level Tf and determines from this operation whether each derivative file is acceptable or not. The circuit 84 further generates a corresponding output signal that is similar to the signal generated by the analyzer 54 of FIG. 3.

Figure 5:
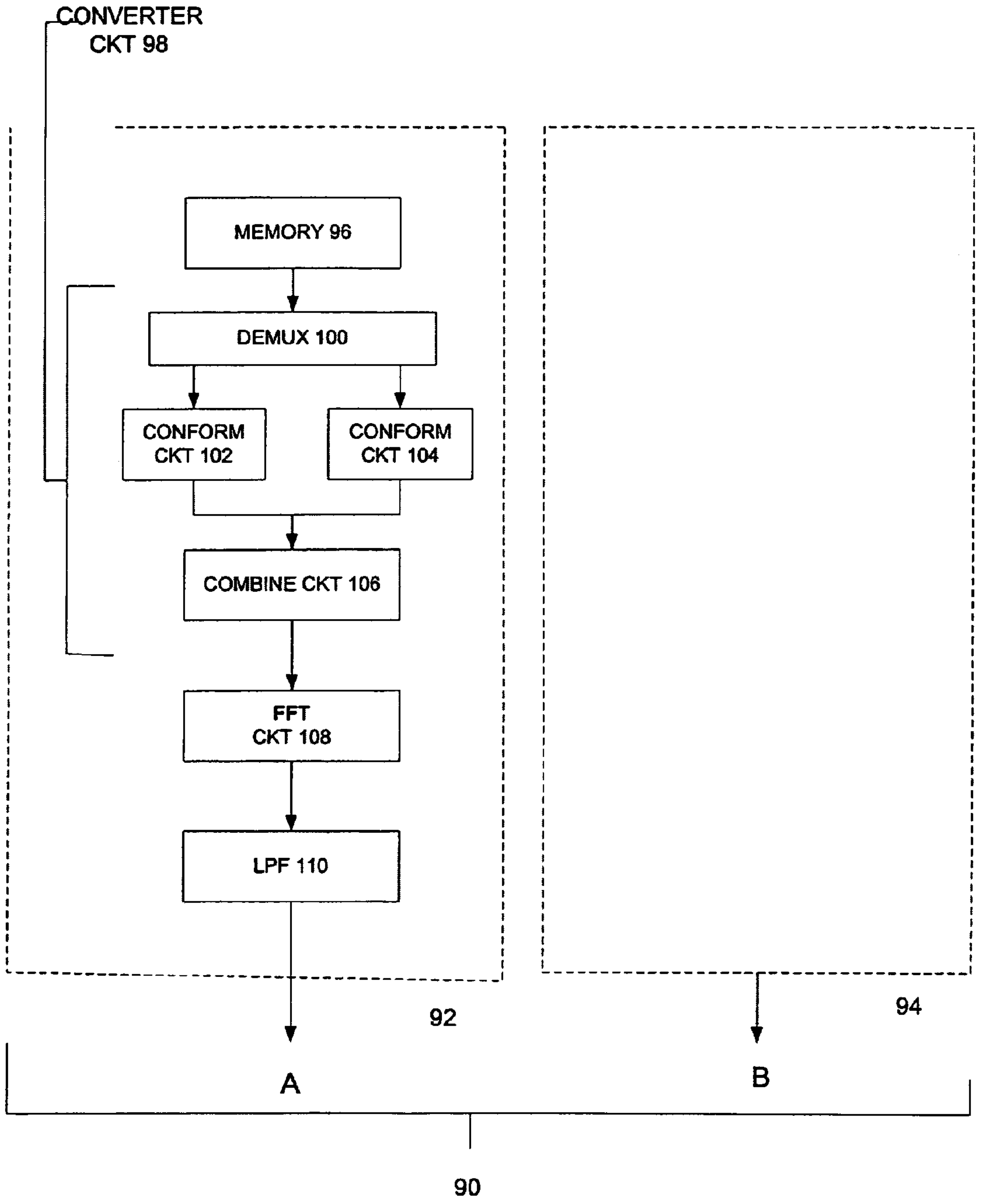
FIGS. 5 and 6 show a block diagram of a third embodiment of the system.
Figure 6:
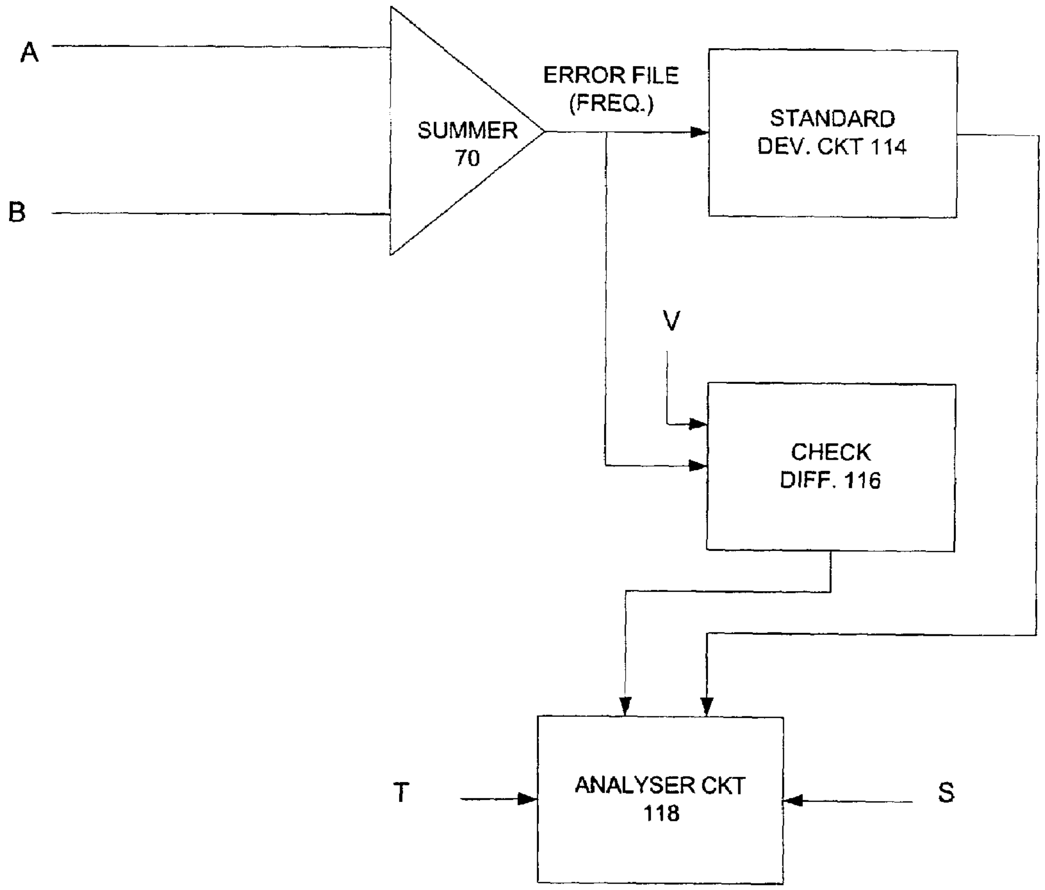

FIGS. 5 and 6 show a preferred embodiment of the invention. In this embodiment, the digital files are again converted to the frequency domain and are analyzed. The apparatus 90 is shown as being composed of two preprocessing elements, 92 and 94. Preprocessing element 92 includes memory 96 that holds the original audio files, again in a standard digital format such as WAV. Of course, the system may be adapted to handle other digital formats such as PCM, AIFF, etc. Each file retrieved from the memory 96 is fed to a converter circuit that converts the WAV file into a digital audio file consisting of a single stream of bytes. As part of this conversion, the WAV file is fed to a demultiplexer 100 that generates the bytes for the left and the right channels. Normally, these channels have the same characteristics (i.e., bit depth and sample rate). However, if the channels do have different characteristics, then each channel is fed to a respective conformer circuit 102, 104 which insures that the channels do have the same characteristics. A combiner circuit 106 then combines the two conformed channels. For example, the combiner circuit 106 may interleave the signals of the two channels on a byte-by-byte basis. It should be understood that a multi-channel signal (for example, a 5.1 or 6 channel) is handled in the same manner, i.e., the bytes from all the channels are combined into a single byte stream. Next, the single byte stream is fed to a Fast Fourier Transform (FFT) circuit 108. This circuit converts a time domain segment of the stream having a predetermined number of bytes N into a corresponding frequency domain segment. For example, N may be about 1024 bytes. As is known in the art, the circuit performs this transformation by generating M frequency components, each component corresponding to the spectral content of said N bytes within a certain frequency range. Importantly, as the processing of the stream of bytes progresses, it is advisable to select the N bytes for each testing (described in detail below) with an overlap over the bytes between successive conversions. More specifically, a segment with bytes $B_k$–$B_{k+N}$ is converted, then in the next segment to be converted is segment $B_{k+c}$–$B_{k+c+N}$ where c<N. Typically c is selected so that there is about a 50% overlap between the sets of bytes being tested. Schemes for performing FFT that insure such an overlap are known in the art (such as Hanning, discussed above, triangular or Blackman). The purpose of using overlap is to eliminate, or at least reduce, side lobe spectra caused by the truncation of the audio files while each finite number of bytes N is processed.

The number N is a design parameter that is determined based on a number of different criteria, including the Nyquist frequency for the data stream, and the CODEC used to generate the derivative files, as discussed in more detail below. In order to insure that the transformation is accomplished quickly and efficiently, the DC component of the transformed signals and the frequency components above a certain cut-off frequency, as well as all phase information is disregarded. The cut-off frequency is, again, dependent on the CODEC used.

This cut-off frequency may be obtained from the manufacturer or may be calculated empirically. For example, a test file can be generated that sweeps the upper band from 15 KHz to the Nyquist frequency. The test file is then encoded and decoded using the CODEC. The decoded file is then analyzed to determine what higher frequencies have not been encoded or processed by the CODEC.

The process of eliminating the higher frequencies that are not processed by the CODEC is represented symbolically by low pass filter 110. The end result generated by the preprocessor 92 is a file A consisting of the frequency components of a segment of an original file.

The preprocessing element 94 performs the same function on the stream of bytes representative of the derivative files and, accordingly, its components are essentially identical to the components of the element 92. Importantly, the two elements are arranged to insure that the characteristics of the byte stream from the derivative digital file are substantially identical to the characteristics of the stream from conform circuits 102, 104. Preprocessing element 94 generates file B consisting of the frequency components of a segment of a derivative file.

Referring to FIG. 6, the summer 70 generates an error file EF consisting of the differences between the respective components of files A and B. In other words, This error file EF is then fed to a standard deviation circuit 114 that calculates the standard deviation SD of the components of error file EF.

The error file EF is also fed to a check circuit 116 that compares each differential component to a threshold value V. The parameters resulting from each calculation is then provided to an analyzer circuit 118.

The operation of the apparatus 90 is controlled by a standard microprocessor having a memory used to store various operational parameters, programming information for the microprocessor, and other data. Of course, at least some, or all of the elements of the system can be implemented as software by the microprocessor, however, they have been shown here as discrete elements for the sake of clarity.

Figure 7:
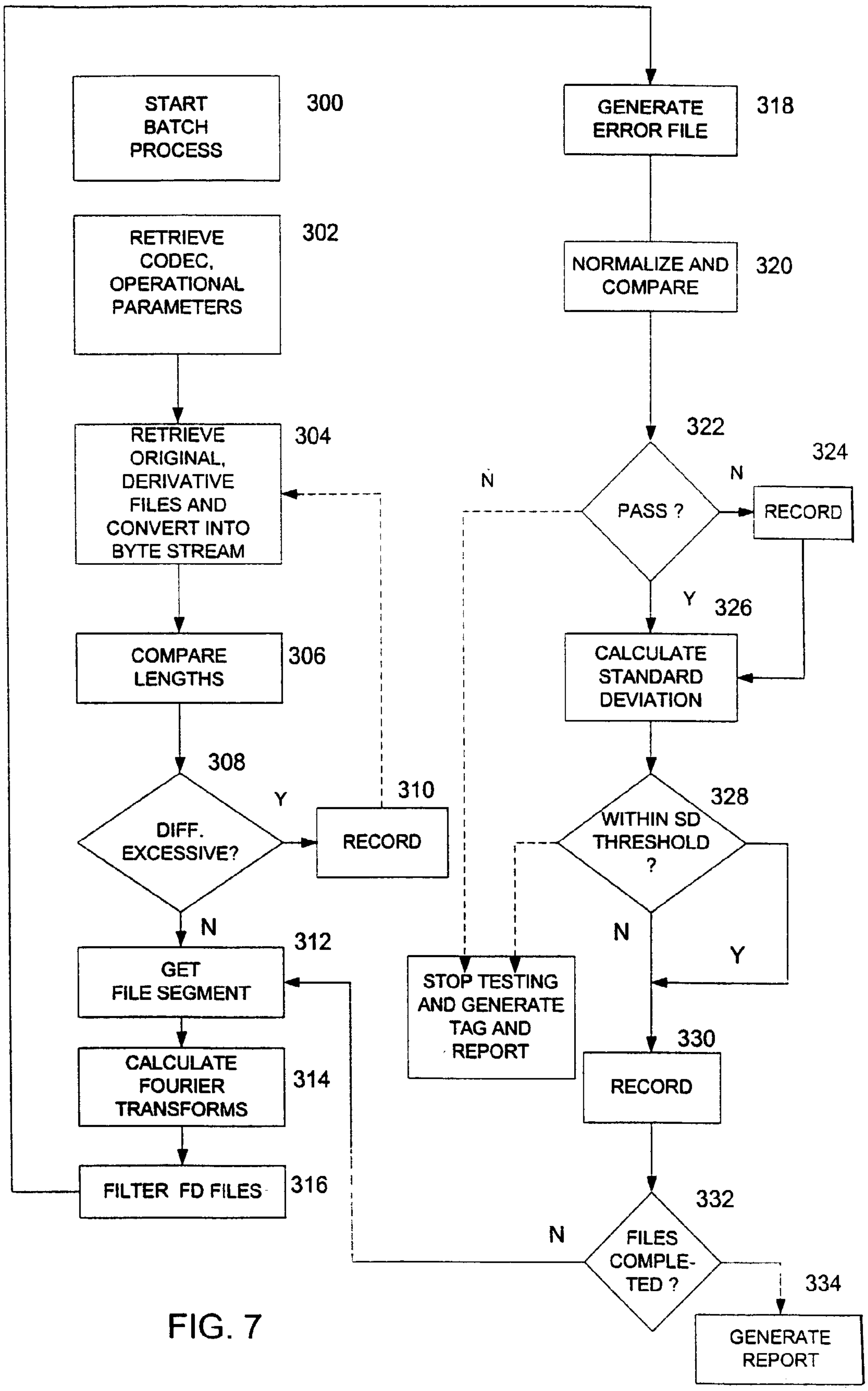
FIG. 7 shows a flow chart of the operation of the system of FIGS. 5 and 6.

The operation of the apparatus 90 is now described in conjunction with FIGS. 5 and 6 and the flow chart of FIG. 7.

In step 300, a batch process is started for testing a plurality of derivative digital files. The apparatus 90 is designed to handle a large number of such files. The original and derivative digital files are loaded into the memories of the preprocessors 92, 94 in the usual manner. In step 302 the CODEC is identified and its parameters are retrieved from a memory and loaded so that they can be used by the respective elements of the system.

In step 304, an original digital file and the respective derivative file are retrieved from the respective memories and converted into a stream of digital bytes as discussed above, by converter circuit 98. Some preliminary testing is then performed to insure that the two files are compatible and have not been corrupted. For example, typically, the derivative file is somewhat longer than the original file. Therefore, in step 306, the difference in the lengths of the two files is determined. In step 308, this difference is compared to a parameter L. As discussed below, this parameter is dependent on the CODEC used. If this difference is excessive, this event is recorded in step 310. Other preliminary checks may also be performed at this time to determine if the files have the correct formats, that they can be read correctly, and so on. If one or more of these criteria indicate that one of the files is unusable, then after the event is recorded, the test for this set of files may be terminated and a test for the next pair of files may be initiated. Alternatively, the test could continue since the result of the remaining tests, even if negative may provide some useful information during troubleshooting of either the system or the files.

In step 312, a segment of a predetermined length (for example, 1024 bytes) is selected from each file. In step 314, the FFT is calculated for each segment. The result is a set of frequency components OF0, OF1, OF2 . . . OFp, for the original digital file segment, and another set of components DF0, DF1, DF2 . . . DFp for the derived digital file segment. Each pair of components (i.e., OF0, DF0; OF1, DF1; etc.) is associated with a particular frequency range.

In step 316, these components are filtered (by eliminating the DC values OF0, DF0, and the high frequency components which are beyond the range of the respective CODEC, e.g., OFp and DFp).

In step 318, an error file is generated by a summer by calculating the difference between the respective frequency components of the segments. That is, a file is generated that consists of a sequence of values D1, D2 . . . Dp where D1=abs [OF1−DF1]; D2=abs [OF2−OD2], etc.

In step 320, each value D1, D2 . . . Dr is normalized and compared to a threshold level E. The normalization is performed by dividing each value Di by OFi to equalize the effects of loud and low intensity sounds. If any of the normalized values are larger than E, the event is recorded in step 324. Once all the values D1, D2. Dr are verified in this manner, then, in step 326, the standard deviation SD is calculated for all the values D1, D2 . . . Dr. In step 328, the standard deviation is compared to another threshold value TS. The results are logged in step 330. In step 332, a test is performed to determine if any segments of the files still need to be checked. If so then the test continues with step 312 by retrieving another segment. When all the segments are checked, in step 334, a tag is generated and appended to the derivative file. This tag indicates either that the derivative file has passed all the tests, and, accordingly, it is acceptable or that file failed some tests and, hence, the derivative file is unacceptable. Optionally, a report is also generated to indicate the results of the various tests. The report can be generated and stored independently of whether a particular derivative file is acceptable or not.

In an alternative mode of operation, when any segment of a file has failed a check, for instance, the test of step 322 or step 328, an appropriate report and tag are generated in step 336 and the remainder of the current derivative file is not tested, but instead the test goes on to the next set of files.

In this manner, all the files in a batch are tested and each derivative file is tagged and/or a report is generated detailing the results of the tests. Therefore, once the tests are completed, the tags for the derivative files can be reviewed, and if the tags so indicate, the rejected derivative files can be discarded. If a large percentage of a batch of derivative files are rejected, then the reports for the respective files can be reviewed to determine why the files were rejected. While the tests disclosed above and in the Figures require a relatively large number of computations, the algorithm presented requires only a small number of parameters, all being related mostly to the type and operational characteristics of the CODEC 36 (FIG. 2) used to generate the derivative files. As discussed above, these parameters can be obtained at the beginning of testing a batch of files.

The various thresholds and other parameters discussed in the description can be derived empirically by generating a plurality of original files, running the original files through the specific process to obtain corresponding derivative files, and then testing the derivative files using the derivative files to determine the corresponding threshold values. The testing system and process itself can be monitored. If the system and process accepts or rejects too many files, these thresholds may be adjusted accordingly.

The inventors have determined that by using the system and method of FIGS. 5–7, considerable cost savings can be achieved. Moreover, the derivative files can be tested much faster than when the manual technique is used.

Obviously, numerous modifications may be made to this invention without departing from its scope as defined in the appended claims.

We claim:

1. A method of verifying automatically the quality of a plurality of derivative files obtained from original files, comprising the steps of:

synchronizing each derivative file with a corresponding original file;

comparing the synchronized derivative and original digital files by calculating differences between portions of the derivative and original digital file; generating an error signal indicative of said differences including generating a tag for each derivative file indicative of whether said differences exceed a predetermined threshold value; and attaching said tags to the respective derivative file.

2. The method of claim 1 further comprising generating an error file consisting of said error signals.

3. The method of claim 1 further comprising comparing portions of segments of said derivative and original files, wherein said segments are taken in the time domain.

4. The method of claim 1 further comprising comparing portions of segments of said derivative and original files, wherein said segments are taken in the frequency domain.

* * * * *